United States Patent

[11] 3,607,906

[72] Inventors Hansdieter Hofmann
 Petter-Weil;
 Stefan Janacek, Dietzenbach; Horst
 Corsepius, Frankfurt am Main, all of
 Germany
[21] Appl. No. 777,463
[22] Filed Nov. 20, 1968
[45] Patented Sept. 21, 1971
[73] Assignee Vickers-Zimmer Aktiengesellschaft
 Planung und Bau von Industrieanlagen
[32] Priority Nov. 22, 1967
[33] Germany
[31] P 16 68 833.8

[54] METHOD OF MAKING NITRILES FROM CARBOXYLIC ACIDS
 4 Claims, No Drawings
[52] U.S. Cl. ................................................ 260/465.2,
 260/465 B, 260/465.4
[51] Int. Cl. ........................................................ C07c 121/10
[50] Field of Search ............................................ 260/465.2,
 465 B

[56] References Cited
UNITED STATES PATENTS

| | | | |
|---|---|---|---|
| 2,144,340 | 1/1939 | Lazier ........................... | 260/465.2 |
| 2,955,130 | 10/1960 | Guyer et al. ................... | 260/465.2 |
| 3,153,084 | 10/1964 | Veazley et al. ................ | 260/465.2 |
| 3,481,969 | 12/1969 | Corsepius et al. ............. | 260/465.2 |

Primary Examiner—Joseph P. Brust
Attorney—Molinare, Allegretti, Newitt & Witcoff ABSTRACT: Nitriles and dinitriles of monocarboxylic and dicarboxylic acids are produced by evaporating the acid in a film-forming evaporating apparatus, which is preferably made of titanium or stainless steel, in the presence of 0.26 to 40 moles of superheated steam per mole of carboxylic acid, the evaporated acid and steam being then mixed with 4 to 60 moles of gaseous ammonia per mole of carboxylic acid and reacted in the gaseous phase at a temperature between 260° to 500° C. in the presence of a dehydrating catalyst.

METHOD OF MAKING NITRILES FROM CARBOXYLIC ACIDS

This invention relates to the production of nitriles and dinitriles from aliphatic and aromatic monocarboxylic and dicarboxylic acids.

The production of nitriles and dinitriles from aliphatic and aromatic monocarboxylic and dicarboxylic acids usually proceeds by reacting the carboxylic acids with ammonia at elevated temperatures in the gas phase in the presence of heterogeneous dehydrating catalysts. For performing this reaction the carboxylic acids are first evaporated in an evaporator in the presence of ammonia as a carrier gas, the vapor mixture being then conducted over the catalysts in a stationary bed.

When the reaction product has been condensed, the surplus ammonia is usually partly or wholly recycled through the evaporator.

The reaction in the gas phase provides yields between about 82 and 92 mole percent related to the quantity of carboxylic acid evaporated. Secondary products that form principally comprise ketones and their condensation products, and the corresponding acid amides which constitute incompletely reacted intermediate products. The reaction products that form in the nitrilation of dicarboxylic acids also contain the heminitriles. Despite the useful yields which this reaction provides, the process is technically not satisfactory because during the process of evaporation undesirable losses of starting material, particularly of higher molecular weight carboxylic acids, occur, these being due to tar formation and the decomposition of the carboxylic acids as well as to the premature formation of amides in the presence of ammonia. The magnitude of these losses essentially depends upon the nature of the carboxylic acid, its boiling point, its thermal stability and the material of which the evaporator is made. For instance, ketonation of the carboxylic acid is greatly promoted by iron, chromium and nickel. Depending upon the nature of the evaporating apparatus, these losses may amount to between 4 and 20 mole percent of the carboxylic acid introduced for evaporation. The difficulties which arise in evaporation are aggravated by the relatively low thermal stability of the carboxyl group which can be removed from the molecule for instance by decarboxylation. Moreover, the dicarboxylic acids in particular tend to carbonize.

There has been no lack of proposals aimed at minimizing these evaporation losses by taking suitable steps and by providing appropriate apparatus. In Ullmann's Tech. Enzyklopaedie, vol. 3, page 98, there is described an aluminum tower packed with Raschig rings, which functions as a trickling evaporator, while preheated ammonia as a carrier gas conveys adipic acid in cocurrent into the reactor. However, it is a drawback of this method that, after a given period of operation, compounds that have a boiling point above that of adipic acid accumulate. It has been found that even in a single pass through a thin-film evaporator in which about 85 percent of the adipic acid evaporates, ammonia being the carrier gas, the nonevaporated adipic acid at 290° to 340° C. has the following composition:

33.6 percent adipic acid
37.5 percent adipic monoamide
28.7 percent adipamide
0.2 percent tar These acid amides considerably impede evaporation and lead to decomposition and carbonization and consequently cause operational troubles.

The tower or trickling evaporator must be cleaned—a complicated process—or large proportions of the nonevaporated adipic acid must be removed. The economy of the process is then very adversely affected.

If only a small proportion of the adipic acid is evaporated, premature clogging of, and carbonization in, the evaporator may be avoided, but not the continuous accumulation of nitrogenous intermediate products.

Cleaning or processing the monocarboxylic or dicarboxylic acid which has not evaporated, and which in the case of adipic acid is a mixture of adipamide, adipic monoamide, adipic acid and tar products, is a very complicated process and therefore not economical. The recycling of the nonevaporated acids, as has been proposed, is not possible in continuous operation and leads to trouble after a few cycles because of the accumulation of higher boiling products.

In another proposal, the carboxylic acids are evaporated in films which are as thin as possible on a heat exchanger and ammonia is likewise used as a carrier gas with or without the addition of steam and/or an inert gas. However, this method of evaporation is likewise incapable of eliminating the above-described difficulties.

In another proposed method adipic acid is evaporated in the presence of an inert gas at a temperature of 200° to 300° C. before being combined with the preheated ammonia, nitrogen preferably being used as the inert gas. Although this proposal permits the adipic acid to be evaporated under milder conditions, the inert gas cannot be condensed out of the reaction mixture that is obtained and therefore accumulates in the ammonia used. This prior method does not therefore permit the ammonia to be recycled, this being a complication which makes the process uneconomical to perform.

It has now been found that an extremely gentle method of evaporating monocarboxylic and dicarboxylic acids consists in evaporating the same in the presence of superheated steam.

The reaction for the formation of the adipic nitrile is an equilibrium reaction which proceeds according to the following equilibrium equation:

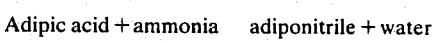

Adipic acid + ammonia ⇌ adiponitrile + water

It was therefore to be expected that the presence of water would displace the equilibrium state in favor of adipic acid and that the mixture of carboxylic acid and water from the evaporation process would not therefore be suitable as a starting material for the production of nitriles. Surprisingly, the formation of the acid nitriles is not adversely affected by the proposed method of evaporation.

Accordingly, the present invention provides a method of producing a nitrile or dinitrile of a monocarboxylic or dicarboxylic acid wherein the monocarboxylic or dicarboxylic acid is evaporated in a film-forming evaporating apparatus in the presence of 0.26 to 40 moles of superheated steam per mole of carboxylic acid and the gaseous mixture is then mixed with 4 to 60 moles of gaseous ammonia per mole of carboxylic acid, and wherein the resulting mixture is reacted in the gas phase at a temperature between 260° and 500° C. in the presence of a dehydrating catalyst.

In the present method from 1 to 10 moles of superheated steam are preferably used.

The carboxylic acids may be partly or completely evaporated, and preferably from 0.5 to 50 percent and more preferably from 2 to 25 percent of the nonevaporated carboxylic acids are withdrawn from the bottom of the evaporator. These monocarboxylic and dicarboxylic acids that have not been evaporated are substantially free from nitrogenous impurities and they can be returned into the evaporator without causing major operational difficulties, as is the case in the prior art methods.

The steam is introduced into the evaporator in a superheated state preferably at a temperature of 180° to 500° C, more preferably between 280° and 450° C. The evaporator may be either a thin-film, falling-film, or trickling evaporator. Conveniently, those parts of the evaporator which make contact with the product consist of titanium or stainless steel containing more than 6 percent molybdenum.

The mixture of steam and gaseous carboxylic acid obtained by the evaporation is combined with the preheated ammonia either before it enters the reactor or in a bed of the catalyst itself.

The reaction of the gaseous carboxylic acid with ammonia is preferably performed over a solid catalyst contained in a fluidized bed or in tubes having a diameter between 25 and 100 mm.

The solid catalysts used must have dehydrating properties, and suitable catalysts include boron phosphate, montmorillonite, hetero-polybasic acids, and phosphoric acid on carrier substances. The reaction temperatures may generally be between 250° and 430° C., preferably between 290° and 380° C.

However, it has proved particularly convenient to perform the reaction in a moving catalyst bed kept in motion by recycled ammonia. The mixture of steam and carboxylic acid formed by the evaporation is introduced into this moving catalyst bed without the addition of further ammonia.

That the presence of water does not interfere with the reaction of carboxylic acids with ammonia to form nitriles will be apparent from the following table.

The effect of water upon the reversible equilibrium between adiponitrile and δ-cyanovaleric amide at 330° C. in the presence of a fresh phosphoric-acid-silica-gel granulate as the catalyst was examined in the case of the formation of the nitrile of adipic acid.

| Moles adipic acid | Moles ammonia | Moles water addition | Moles adiponitrile | Moles δ-cyanovaleric amide |
| --- | --- | --- | --- | --- |
| 1 | 28-30 |  | 0.938 | 0.003 |
| 1 | 28 | 5.5 | 0.946 | 0.005 |
| 1 | 30 | 20.0 | 0.884 | 0.071 |

It will be seen that even a water addition of 20 moles per mole of adipic acid has no significant effect.

In a useful embodiment of the invention, the evaporator for the dicarboxylic acid is constructed from titanium or stainless steel containing more than 6 percent molybdenum.

It is thus possible to suppress the adverse effect of the material on the liquid carboxylic acids as well as the effect of the ammonia.

That this effect can be considerable is proved by the following tests:

The adipic acid used had a melting point of 151° to 152° C. and its alpha color index was less than 10 (20 percent methanolic solution). The adipic acid was filled into glass ampuls, melted and purged with pure nitrogen and then heated in each case for 30 minutes at 295° C. in an oil bath, in pure nitrogen, unsaturated steam, and ammonia atmosphere. Changes in the adipic acid were determined by observing its melting point and its alpha color index. At the same time the influence of various materials was also examined (10 percent of the weight of the adipic acid used in the form of matching chips):

| Material | Gas atmosphere | Melting point, 0° C. | Alpha color index |
| --- | --- | --- | --- |
| Glass | Nitrogen | 149/150 | 25 |
| Do | Ammonia | 129/136 | 420 |
| Do | Steam | 150/151 | 20 |
| SS 316 TI | Nitrogen | 149/150 | 960 |
| SS 316 TI | Ammonia | 133/142 | 2200 |
| Titanium | do | 138/145 | 422 |
| "Hastelloy" C* | do | 141/147 | 130 |
| Do.* | Steam | 150/151 | 18 |

* "Hastelloy" is a registered trademark.

The table shows that apart from the gas atmosphere the material of the evaporating apparatus had a considerable effect on the process of evaporation.

The unfavorable effect of the ammonia is significantly accentuated by the presence of unsuitable structural metallic materials.

When the period of action was extended to 3 hours the adipic acid was converted in each case in which ammonia was present to a dark brown tarry mass, whereas otherwise a merely slightly discolored adipic acid was still always obtained.

The following examples illustrate the method according to the invention.

EXAMPLE 1

In a trickling evaporator, made of "Hastelloy" C, 95 g. of adipic acid per hour were completely evaporated in cocurrent at 320° C. in the presence of 65 g. of water in the form of superheated steam. Shortly before entering a reactor, 400 litres of ammonia (S. T. P.) were introduced into the adipic-acid-steam mixture. After having passed through a mixing zone, the reactants entered a catalyst bed which was contained in the reactor and which was kept at 330° C. The catalyst volume in the reactor was 1 litre, and the catalyst consisted of silica gel strands impregnated with phosphoric acid. The reaction products were cooled after having left the reactor, and 63.8 g. of adiponitrile were obtained per hour, this corresponding to yield of 92.8 percent of the theoretical yield. After 50 hours of operation, the evaporator contained no coking products, whereas considerable deposits and carbonization occurred when ammonia was used as the carrier gas.

EXAMPLE 2

In a thin film evaporator having an evaporating surface of about 0.2 square meters, 6.8 kg. of molten adipic acid were introduced overhead, whereas 2.94 kg. of water in the form of superheated steam were introduced into the bottom of the evaporator. The steam temperature was 350° C. The process of evaporation in countercurrent was so controlled that 0.7 kg. per hour of adipic acid that had not been evaporated left the thin film evaporator per hour. The issuing adipic acid melt was nearly colorless and completely free from nitrogenous adipic acid derivatives, including ammonium salts.

On its way to the reactor which contained 60 litres of a dehydrating solid catalyst (18 percent phosphoric acid on silica gel strands) contained in tubes, 30 m³. (S. T. P.) of gaseous ammonia that has been preheated to 330° C. were mixed with the adipic-acid-steam mixture. The steam-gas mixture was reacted in the reactor at 335° C.

After condensation, the reaction product which formed two layers was separated and each layer was analyzed. For a period of 45 hours 196.5 kg. of adiponitrile were found to be contained in the reaction products. This corresponds to a yield, related to adipic acid evaporated, of 96.7 percent of the theoretical yield. The proportion of γ-cyanovaleric amide in the reaction products was 0.46 mole percent.

EXAMPLES 3 to 6

In a trickling evaporator there were supplied the following carboxylic acids, in the amount of 100 parts by weight each, in the presence of 10 times the molar amount of water in the form of superheated steam, and with 50 times the molar amount of ammonia to a solid bed reactor with dehydrating catalyst (18 percent phosphoric acid and 0.3 percent vanadium pentoxide on silica gel strands). The reaction temperature was maintained at 330° to 340° C. The vapor-gas mixture leaving the reactor was cooled and the condensate precipitated was worked up by extraction and distillation. The following nitrile yields were achieved:

| Experiment Number | Acid | Parts by weight of nitrile |
| --- | --- | --- |
| 3 | Capric acid | 80.5 capric acid nitrile. |
| 4 | Azelaic acid | 75 azelaic acid dinitrile. |
| 5 | 1,10-decanedicarboxylic acid | 69 NC—(CH$_2$)$_{10}$—CN 1,10-dicarboxylic acid dinitrile. |
| 6 | Benzoic acid | 81 Benzo-nitrile. |

What is claimed is:
1. A method of producing a nitrile of an organic acid selected from the group consisting of vaporizable alkane monocarboxylic and dicarboxylic acids and benzoic acid, comprising the steps of: forming a film of the acid on a surface of a film-forming evaporating apparatus, evaporating the acid from said surface in the presence of 0.26 to 40 moles of superheated steam per mole of carboxylic acid in the substantial absence of ammonia, said steam having a temperature of at least 180° C., mixing the thus evaporated acid with from 4 to 60 moles of gaseous ammonia per mole of carboxylic acid, and reacting the resulting mixture of acid, steam and ammonia in the gas phase at a temperature between 260° and 500° C. in the presence of a dehydrating catalyst.

2. The method of claim 1 wherein the acid is evaporated in the presence of 1.0 to 10 moles of superheated steam.

3. The method of claim 1 wherein said surface is titanium or stainless steel containing more than 6 percent molybdenum.

4. The method of claim 1 wherein the acid is adipic acid.